US012395720B2

(12) United States Patent
Modaragamage

(10) Patent No.: US 12,395,720 B2
(45) Date of Patent: Aug. 19, 2025

(54) CHINSTRAP CAMERA DEVICE

(71) Applicant: Heshan Kalana Modaragamage, Fort Erie (CA)

(72) Inventor: Heshan Kalana Modaragamage, Fort Erie (CA)

(*) Notice: Subject to any disclaimer, the term of this patent is extended or adjusted under 35 U.S.C. 154(b) by 0 days.

(21) Appl. No.: 18/882,978

(22) Filed: Sep. 12, 2024

(65) Prior Publication Data
US 2025/0088728 A1 Mar. 13, 2025

Related U.S. Application Data
(60) Provisional application No. 63/582,257, filed on Sep. 13, 2023.

(51) Int. Cl.
*A42B 3/30* (2006.01)
*A42B 3/04* (2006.01)
*A42B 3/08* (2006.01)
*H04B 1/3827* (2015.01)
*H04N 23/57* (2023.01)

(52) U.S. Cl.
CPC ............. *H04N 23/57* (2023.01); *A42B 3/042* (2013.01); *A42B 3/0433* (2013.01); *A42B 3/08* (2013.01); *A42B 3/30* (2013.01); *H04B 1/385* (2013.01); *H04B 2001/3866* (2013.01)

(58) Field of Classification Search
CPC ......... A42B 3/042; A42B 3/0433; A42B 3/08; A42B 3/30; H04B 1/385; H04N 23/57
See application file for complete search history.

(56) References Cited

U.S. PATENT DOCUMENTS

| 4,817,633 | A | * | 4/1989 | McStravick | A61B 5/398 600/595 |
| 6,028,627 | A | * | 2/2000 | Helmsderfer | F16M 13/04 348/157 |
| 6,298,483 | B1 | * | 10/2001 | Schiebl | A42B 3/08 2/9 |
| 8,621,671 | B1 | * | 1/2014 | Schiebl | A42B 3/205 2/421 |
| 9,210,963 | B1 | * | 12/2015 | Ellis | H04R 1/028 |
| 9,737,104 | B1 | * | 8/2017 | Harris | G03B 17/561 |

(Continued)

FOREIGN PATENT DOCUMENTS

| WO | WO-2010005045 A1 | * | 1/2010 | ............. A42B 3/30 |
| WO | WO-2016057773 A1 | * | 4/2016 | ............. A42B 3/127 |
| WO | WO-2022087091 A1 | * | 4/2022 | ......... H04N 21/2187 |

*Primary Examiner* — Tajash D Patel
(74) *Attorney, Agent, or Firm* — PATENTFILE, LLC; Bradley C. Fach; Steven R. Kick

(57) ABSTRACT

A chinstrap camera device may include a body having an inner pad member and an outer chin safety cover. The inner pad member may be coupled to the outer chin safety cover, and the inner pad member may include a body cavity that is configured to receive a portion of a chin of a user. One or more flexible straps may be coupled to the body. A helmet fastener may be coupled to one or more of the flexible straps, and each helmet fastener may be configured to be coupled to a helmet. A camera and a radio module may be coupled to the body. The radio module may be in electronic communication with the camera, and the radio module may be configured to transmit image data recorded by the camera. Optionally, the device may include a helmet that may be configured to be worn on the head of a user.

20 Claims, 7 Drawing Sheets

(56) References Cited

U.S. PATENT DOCUMENTS

| | | | |
|---|---|---|---|
| 2015/0208749 A1* | 7/2015 | Carroll | A42B 3/044 |
| | | | 2/422 |
| 2015/0245680 A1* | 9/2015 | Partlo | A42B 3/0473 |
| | | | 2/411 |
| 2015/0282548 A1* | 10/2015 | Tulley | A42B 3/04 |
| | | | 396/428 |
| 2018/0192727 A1* | 7/2018 | Chen | A45F 5/02 |
| 2021/0315303 A1* | 10/2021 | Daddi | A42B 3/08 |

* cited by examiner

CHINSTRAP CAMERA DEVICE

CROSS REFERENCE TO RELATED APPLICATIONS

This application claims priority to and the benefit of the filing date of U.S. Provisional Application No. 63/582,257, filed on Sep. 13, 2023, entitled "CHINSTRAP CAMERA DEVICE", which is hereby incorporated by reference in its entirety.

FIELD OF THE INVENTION

The present invention relates to the field of systems and devices for helmet and other headwear chin straps, including those typically employed in sports and safety helmets. More specifically, it relates to a chinstrap device incorporating advanced technologies, including electronics, sensors, and video capture technology, which may be used to capture in-game performance metrics of athletes and facilitate communication with a peripheral device.

BACKGROUND

The present technological landscape within the domain of helmet chinstraps is primarily concerned with enhancing wearer safety, particularly in the context of mitigating head injuries. However, certain deficiencies persist within the existing technology, particularly relating to functional limitations, video capture capabilities, and the integration of biometric technology, all of which would enable the comprehensive collection of wearer health and performance data.

Previous endeavors to address these issues, such as in the realm of sports, have involved the integration of sensors and video capture technology into helmets for the purpose of capturing in-game video footage from the player's perspective. Yet, the inherently physical nature of contact sports has rendered these solutions increasingly impractical. These prior attempts have met with limited success, largely due to the stringent requisites governing helmet replacements, strict manufacturing standards, and various other factors. Firstly, the weight and bulkiness of integrated sensors and cameras have imposed discomfort upon players, thereby impeding their mobility and peak performance. Secondly, the prohibitively high costs associated with these solutions have posed adoption challenges, particularly for teams and educational institutions constrained by budgetary limitations. Furthermore, efforts to employ specialized external mounting devices for attaching external camera systems to helmets have proven ineffective and unsafe, given their external attachment and inadequate integration into players' equipment.

Within the realm of sports, there exists a noticeable deficiency in access to real-time data and information concerning the performance and health status of athletes during both games and practice sessions. This absence of immediate information poses significant challenges for coaches and trainers in their efforts to evaluate player techniques and enact necessary adjustments aimed at enhancing performance. Moreover, it presents hurdles for medical personnel tasked with the identification and diagnosis of injuries in a timely manner.

Additionally, there is a conspicuous absence of mechanisms enabling players to generate and subsequently assert ownership over in-game content centered on their performance. This limitation deprives players of a level of control and ownership over the entertainment they generate. Consequently, players are predominantly confined to sharing third-party generated content with their fanbase. This practice not only exposes them to potential liabilities but also complicates the task of garnering support and fostering engagement from their fanbase.

Therefore, a need exists for novel devices which enable the comprehensive collection of wearer health and performance data and which do not suffer from the drawbacks of the above-mentioned devices and methods.

BRIEF SUMMARY OF THE INVENTION

A chinstrap camera device is provided. In some embodiments, the device may include a body having an inner pad member and an outer chin safety cover. The inner pad member may be coupled to the outer chin safety cover, and the inner pad member may include a body cavity that is configured to receive a portion of a chin of a user. One or more flexible straps may be coupled to the body. A helmet fastener may be coupled to one or more of the flexible straps, and each helmet fastener may be configured to be coupled to a helmet. A camera and a radio module may be coupled to the body. The radio module may be in electronic communication with the camera, and the radio module may be configured to transmit image data recorded by the camera.

In further embodiments, the device may include a helmet that may be configured to be worn on the head of a user, such as a football helmet or other head protecting helmet that typically may utilize a chinstrap to help secure the helmet to the user's head, and the helmet fasteners may be configured to secure the flexible straps to the helmet.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
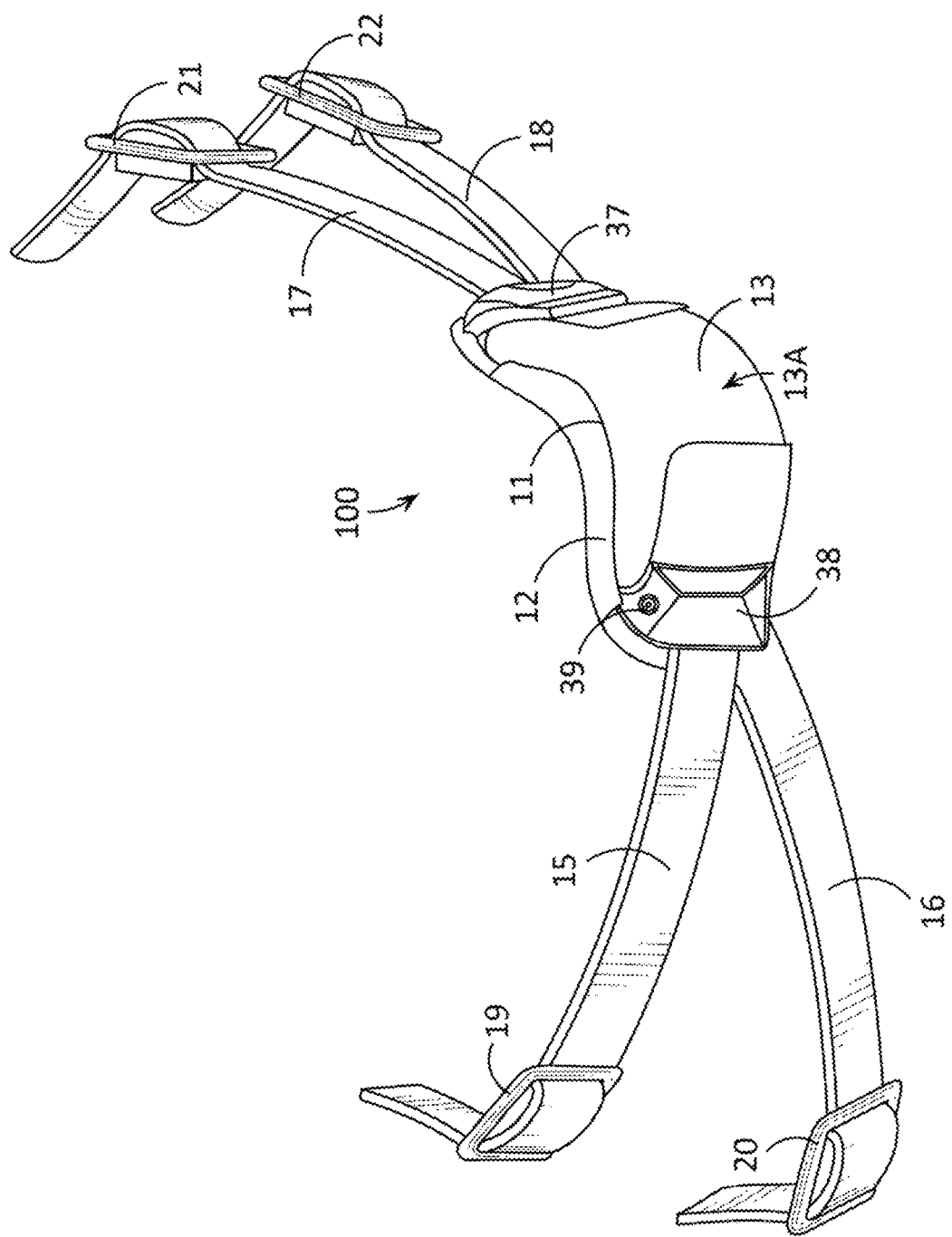
FIG. 1 depicts a front perspective view of an example of a chinstrap camera device according to various embodiments described herein.
Figure 2:
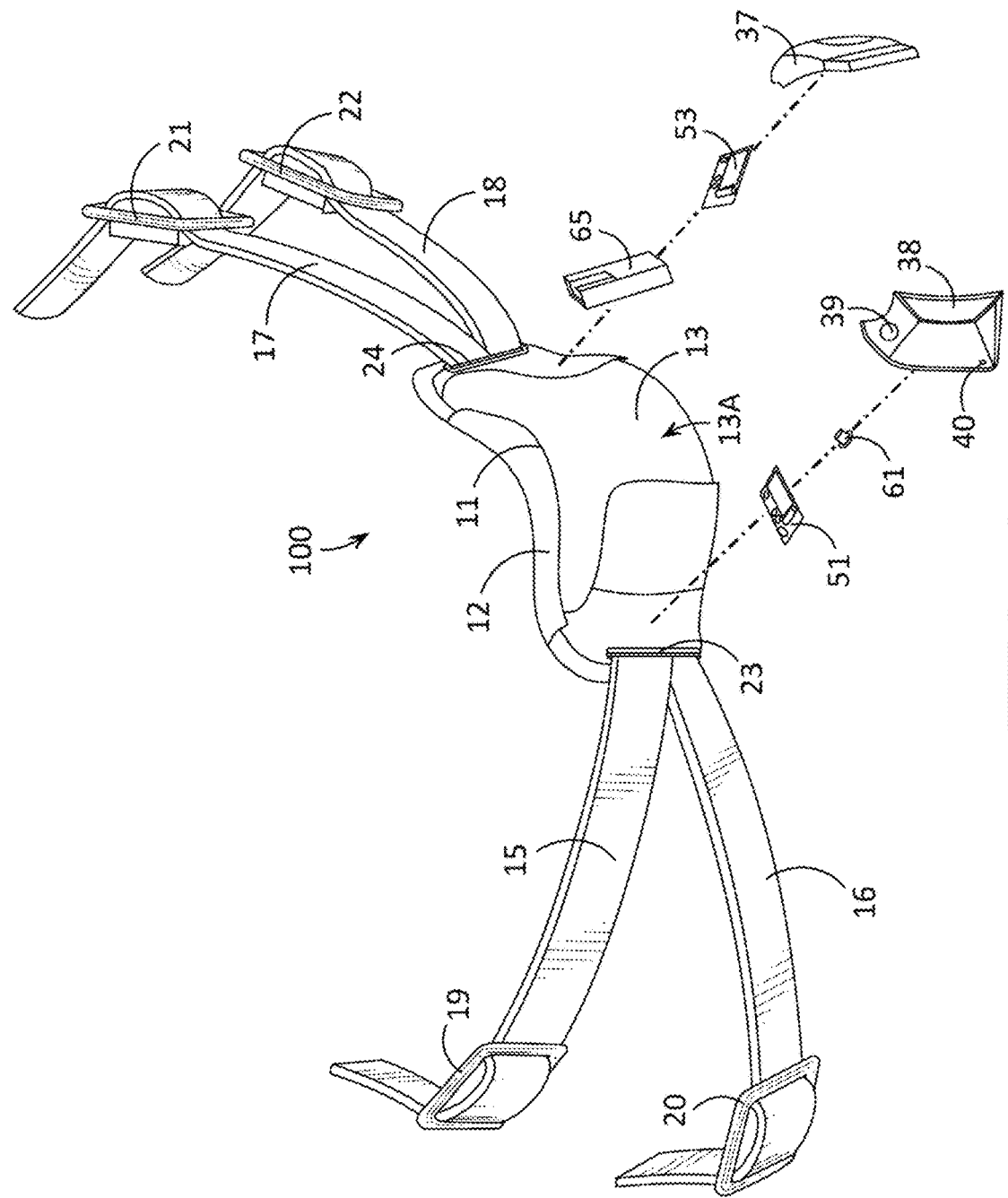
FIG. 2 illustrates a partial exploded, front perspective view of an example of a chinstrap camera device according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 20% of the specified number. Additionally, as used in this application, the term "substantially" means that the actual value is within about 10% of the actual desired value, more preferably within about 5% of the actual desired value and even more preferably within about 1% of the actual desired value of any variable, element or limit set forth herein.

A new chinstrap camera device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIG. 1 illustrates an example of a chinstrap camera device ("the device") 100 according to various embodiments. In some embodiments, the device 100 may comprise a body 11 having an inner pad member 12 that may be coupled to an outer chin safety cover 13. The inner pad member 12 may comprise a body cavity 14 that may be configured to receive a portion of a chin 201 of a user 200. One or more flexible straps 15, 16, 17, 18, may be coupled to the body 11. A helmet fastener 19, 20, 21, 22, may be coupled to one or more of the flexible straps 15, 16, 17, 18, and the helmet fastener 19, 20, 21, 22, may be configured to be coupled to a helmet 300 that may be worn by the user 200. The one or more flexible straps 15, 16, 17, 18, may be configured to extend around a portion of a head 202 of the user 200 to secure the portion of the user's chin 201 within the body cavity 14. A camera 61 and a radio module 53 may be coupled to the body 11, and the radio module 53 may be in electronic communication with the camera 61. The module 53 may be configured to transmit image data recorded by the camera 61.

In some embodiments, the device 100 may comprise a body 11 having an inner pad member 12 that may be coupled to an outer chin safety cover 13. The inner pad member 12 may comprise a body cavity 14 that may be configured to receive a portion of a chin 201 of a user 200. The outer chin safety cover 13 may be coupled to the inner pad member 12 so that the body cavity 14 and outer chin safety cover 13 may be generally positioned on opposing sides of the inner pad member 12 with the outer chin safety cover 13 generally facing away from the chin 201 of a user 200.

An inner pad member 12 may be configured in any shape and size. In preferred embodiments, an inner pad member 12 may comprise a concave body cavity 14 that may be formed into or depressed into the inner pad member 12. Generally, a body cavity 14 may be sized and shaped to receive or fit over all or portions of the chin 201 of a user 200. In preferred embodiments, the inner pad member 12 may be made from or may comprise a cushioning material which may provide shock absorption functions, effectively reducing the impact forces directed towards the critical electronic components (51, 52, 53, 54, 55, 61, 62, 63, 64, 65, 66, 67) that are coupled to the body 11. In preferred embodiments, the inner pad member 12 may be made from or may comprise a cushioning material that may comprise expanded polypropylene (EPP) or expanded polystyrene (EPS) foam materials. In further embodiments, a cushioning material may be made from or may comprise a resilient material, such as silicone foams, rubber foams, silicone rubber, urethane foams including plastic foams, neoprene foam, latex foam rubber, polyurethane foam rubber, or elastomer materials such as elastic plastics, elastic silicone, elastic rubbers, or any other suitable elastomer or resilient material including combinations of materials. Optionally, a body cavity 14 and/or inner pad member 12 may be covered or otherwise include a material, which is preferably impervious to water, such as rubber or flexible plastic, which may be used to further provide comfort to a user 200 and to protect the cushioning material from sweat, cleaning agents, and other contaminants.

Preferably, the device 100 may comprise strategically placed cushioning material, such as foam padding, that serves to provide additional cushioning in proximity to the electronic components (51, 52, 53, 54, 55, 61, 62, 63, 64, 65, 66, 67), thereby affording comprehensive protection for both the user 200 and the electronic components (51, 52, 53, 54, 55, 61, 62, 63, 64, 65, 66, 67) against potential damage. Furthermore, protective measures are extended to safeguard sensitive electronic components, optionally within an integrated camera module through a combination of the aforementioned impact-resistant materials and specialized coatings.

An outer chin safety cover 13 may be configured in any shape and size. In preferred embodiments, outer chin safety cover 13 may be configured to cover all or a portion of the inner pad member 12 that is opposingly positioned to the body cavity 14. In some embodiments, an outer chin safety cover 13 may comprise a central region 13A which may cover all or the majority of the portion of the inner pad member 12 that forms the body cavity 14 so that when worn by a user 200 the central region 13A which may extend over all or the majority of the user's chin 201.

In preferred embodiments, the outer chin safety cover 13 may be made from or may comprise a substantially rigid material which may include resilient and lightweight materials commonly utilized in helmet constructions. These substantially rigid materials encompass impact-resistant plastics, including but not limited to polycarbonate, Acrylonitrile Butadiene Styrene (ABS), thermoplastic polyurethane (TPU), a composite of TPU and polycarbonate (PC), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, or any other material including combinations of materials that are substantially rigid and suitable for use in impact sports, such as football, baseball, etc., and that may form a formidable and shock-absorbing outer layer, engineered to withstand the rigors of gameplay.

The device 100 preferably may comprise one or more flexible straps 15, 16, 17, 18, may be coupled to the body 11. A helmet fastener 19, 20, 21, 22, may be coupled to one or more, and more preferably to each, of the flexible straps 15, 16, 17, 18, and the helmet fastener 19, 20, 21, 22, may be configured to be coupled to a helmet 300 that may be worn by the user 200. Once the flexible straps 15, 16, 17, 18, are coupled to a helmet 300, the flexible straps 15, 16, 17, 18, and body 11 may function as a chin strap assembly that may be used to secure the helmet 300 to the head 202 of the user 200. Generally, the one or more flexible straps 15, 16, 17, 18, may be configured to extend around a portion of a head 202 of the user 200, such as a portion of their cheeks, to secure the portion of the user's chin 201 within the body cavity 14.

Flexible straps 15, 16, 17, 18, may be configured in any shape and size. In preferred embodiments, flexible straps 15, 16, 17, 18, may be elongated in shape. In some embodiments, flexible straps 15, 16, 17, 18, may comprise a length of flexible material such nylon cord and webbing, polypropylene cord and webbing, polyester cord and webbing, various types of flexible plastics such as polyvinyl chloride, natural or synthetic rubber, neoprene foam rubber, synthetic fabrics such as polyester, nylon, rayon, acetate, spandex, lastex, and Kevlar, and natural fabrics such as coir, cotton, hemp, jute, canvas, flax, leather, linen, ramie, wool, silk, or any other suitable flexible natural or synthetic material including combinations of materials.

Any coupling method, fastener, or device may be used to couple a flexible strap 15, 16, 17, 18, to the body 11. In some embodiments, a flexible strap 15, 16, 17, 18, may be coupled to the body 11 by being coupled to the inner pad member 12 and/or to the outer chin safety cover 13. Optionally, a flexible strap 15, 16, 17, 18, may be coupled to the body 11 in a generally non-removable manner, such as by being molded together, via heat welding, via rivet fasteners, via non-removable adhesives, etc. In preferred embodiments, a flexible strap 15, 16, 17, 18, may be coupled to the body 11 so that the flexible strap 15, 16, 17, 18, may be removable and replaceable. For example, the body 11 may comprise one or more strap apertures 23, 24, that a flexible strap 15, 16, 17, 18, may be removably insertable into.

The device 100 may comprise one or more helmet fasteners 19, 20, 21, 22, that may be configured to be coupled to a helmet 300. A helmet fastener 19, 20, 21, 22, may comprise any fastener, device, or method that may be used to couple a flexible strap 15, 16, 17, 18, to a helmet 300.

In preferred embodiments, a helmet fastener 19, 20, 21, 22, may comprise a snap fastener 25, 26, 27, 28, such as a male or female snap fastener. A snap fastener is also commonly called a snap button, press button, press stud, press fastener, dome fastener, popper, snap and tich (or tich button). A male snap fastener and a female snap fastener may comprise a pair of interlocking discs, made out of a metal or plastic, commonly used in place of traditional buttons to fasten clothing and for similar purposes. A circular lip of a male snap fastener fits into a groove on the top of a female snap fastener, holding them fast until a certain amount of force is applied. Different types of snap fasteners can be attached to fabric or leather by riveting with a punch and die set specific to the type of rivet snaps used (striking the punch with a hammer to splay the tail), sewing, or plying with special snap pliers. Typically, helmets 300 have one or more male-type snap fasteners 301 that may be removably coupled to female-type fasteners, such as those found on chin straps. In preferred embodiments, a helmet fastener 19, 20, 21, 22, may comprise a female snap fastener 25, 26, 27, 28, that may be removably coupled to a male-type snap fastener 301 of a helmet 300, e.g., a football helmet.

In further preferred embodiments, a helmet fastener 19, 20, 21, 22, may comprise a helmet buckle that includes a snap fastener 25, 26, 27, 28. A helmet buckle type of helmet fastener 19, 20, 21, 22, may comprise a strap coupling and adjustment type of hardware that may include one or more fastener apertures 41, 42, 43, 44, that may be formed into a plate 31, 32, 33, 34, with a snap fastener 25, 26, 27, 28, coupled to the plate 31, 32, 33, 34. A flexible strap 15, 16, 17, 18, may be coupled to the helmet buckle type of helmet fastener 19, 20, 21, 22, by inserting a portion of the flexible strap 15, 16, 17, 18, into and through the fastener apertures 41, 42, 43, 44, and the snap fastener 25, 26, 27, 28, of the helmet buckle type of helmet fastener 19, 20, 21, 22, may be coupled to a snap fastener 301 of a helmet 300.

Figure 6:
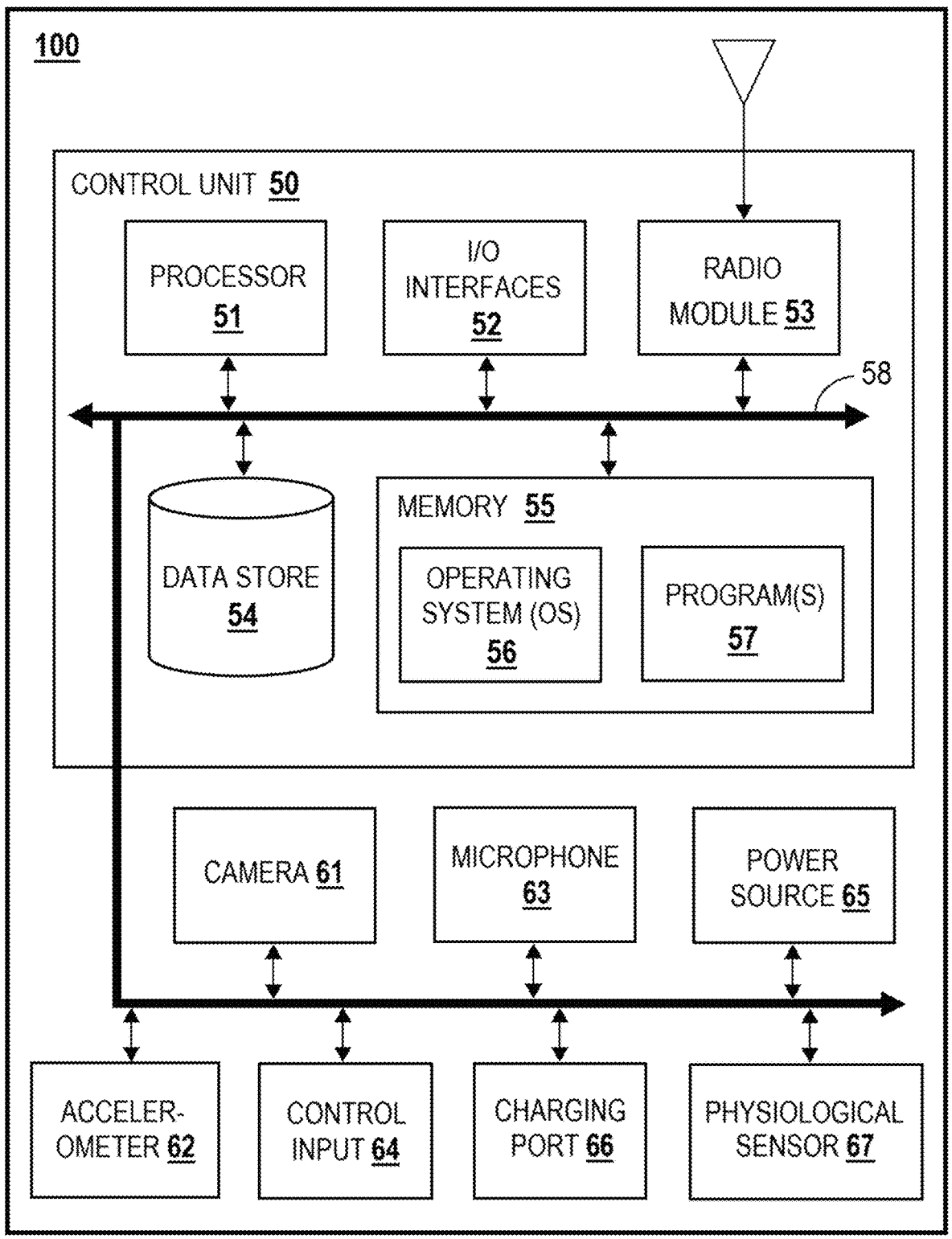
FIG. 6 shows a block diagram of some example electronic component of an example of a chinstrap camera device according to various embodiments described herein.
Figure 7:
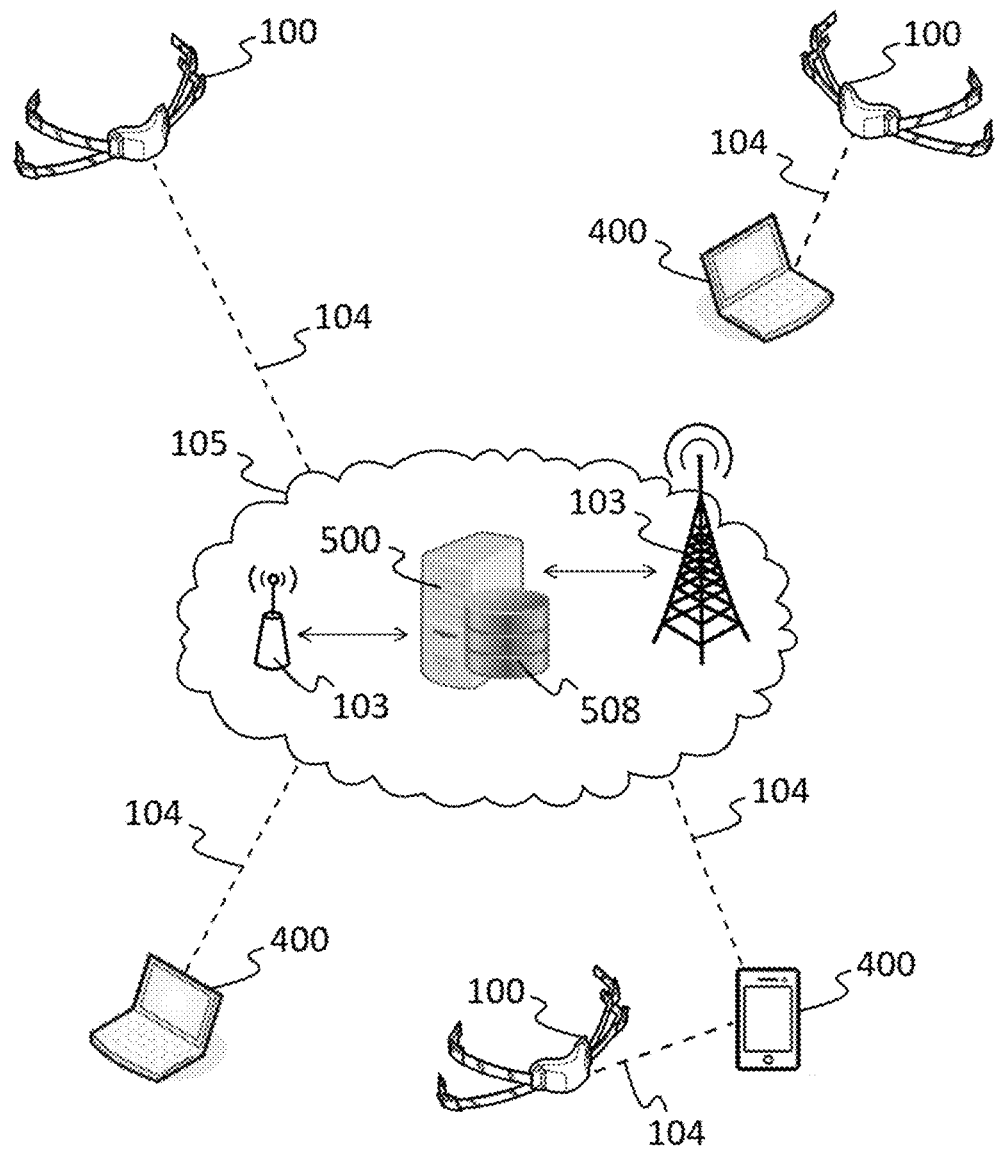
FIG. 7 depicts a schematic diagram of an example of a chinstrap camera device in electronic communication with external electronic devices according to various embodiments described herein.

In some embodiments and in the present example, the device 100 can be a digital device that, in terms of hardware architecture, may comprise one or more of a processor 51, input/output (I/O) interfaces 52, a radio module 53, a data store 54, a memory 55, camera 61, accelerometer 62, microphone 63, control input 64, power source 65, charging port 66, and physiological sensor 67. It should be appreciated by those of ordinary skill in the art that FIG. 6 depicts the device 100 in an oversimplified manner, and a practical embodiment may include additional components or elements and suitably configured processing logic to support known or conventional operating features that are not described in detail herein. Optionally, one or more electronic components (51, 52, 53, 54, 55, 61, 62, 63, 64, 65, 66, 67) may be integrated into a control unit 50.

The electronic components (51, 52, 53, 54, 55, 61, 62, 63, 64, 65, 66, 67) are communicatively coupled via a local interface 58, and the local interface 58 may provide electronic communication between one or more electronic components (51, 52, 53, 54, 55, 61, 62, 63, 64, 65, 66, 67). A local interface 58 can be, for example but not limited to, one or more buses, circuit boards, wiring harnesses, or other wired connections or wireless connections, as is known in the art. The local interface 58 can have additional elements, which are omitted for simplicity, such as controllers, buffers (caches), drivers, repeaters, and receivers, among many others, to enable communications. Further, the local interface 58 may include address, control, and/or data connections to enable appropriate communications among the aforementioned components.

The device 100 may include one or more processors 51 which may be a hardware device for executing software instructions. A processor 51 can be any custom made or commercially available processor, a central processing unit (CPU), an auxiliary processor among several processors, a semiconductor-based microprocessor (in the form of a microchip or chip set), or generally any device for executing software instructions. When the device 100 is in operation, a processor 51 is configured to execute software stored within the memory 55, to communicate data to and from the memory 55, and to generally control operations of the device 100 pursuant to the software instructions. In an exemplary embodiment, a processor 51 may include a mobile optimized processor, such as optimized for power consumption and mobile applications.

The device 100 may include one or more I/O interfaces 52 that can be used by a user 200 to provide user input and display system output data, such as operational status, from the device 100. I/O interfaces 52 can include, for example, buttons, knobs, switches, LED indicator lights, LED display, LCD display, a serial port, a parallel port, a small computer system interface (SCSI), an infrared (IR) interface, a radio frequency (RF) interface, a universal serial bus (USB) interface, and the like.

A radio module 53 enables wireless communication to one or more electronic devices 400, networks 105, etc., so that the radio module 53 may transmit data recorded by the camera 61, accelerometer 62, microphone 63, physiological sensor 67, processor 51, or other electronic component. Generally, a radio module 53 may enable the device 100 to transfer data and information between one or more access points 103, electronic devices 400, and servers 500 over a data network 105. For example, a radio module 53 may enable the device 100 to transfer data and information directly to an electronic device 400 via Bluetooth, WiFi, or other type of network connection 104, such as by using a companion application running on a mobile phone, laptop, or other type of electronic device 400. As another example, a radio module 53 may enable the device 100 to transfer data and information directly to one or more access points 103 via a 3/4/5G cellular, Bluetooth, WiFi, or other type of network connection 104, which may then be accessed using a companion application running on a mobile phone, laptop, or other type of electronic device 400. Electronic devices 400 and servers 500 may send data to and receive data from the data network 105 through a network connection 104 with an access point 103. A data store 508 accessible by the server 500 may contain one or more databases. Electronic devices 400 may include mobile devices, such as laptops, tablet computers, personal digital assistants, smart phones, smart televisions, and the like, that are equipped with a wireless network interface capable of sending data to one or more servers 500 with access to one or more data stores 508 over a network 105, such as a wireless local area network (WLAN). Additionally, electronic devices 400 may include fixed devices, such as desktops, workstations, and the like, that are equipped with a wireless or wired network interface capable of sending data to one or more servers 500 with access to one or more data stores 508 over a wireless or wired local area network 105.

In preferred embodiments, a radio module 53 may operate via WiFi and/or Bluetooth communication standards. In further embodiments, a radio module 53 may comprise a radio that may operate on a cellular band and may communicate with or receive a Subscriber Identity Module (SIM) card or other wireless network identifier. Any number of suitable wireless data communication protocols, techniques, or methodologies can be supported by a radio module 53, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. In further embodiments, a radio module 53 may enable wired network communication and may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The radio module 53 may include address, control, and/or data connections to enable appropriate communications on the network.

An optional data store 54 may be used to store data. The data store 54 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 54 may incorporate electronic, magnetic, optical, and/or other types of storage media.

A memory 55 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 55 may incorporate electronic, magnetic, optical, and/or other types of storage media. Note that the memory 55 may have a distributed architecture, where various components are situated remotely from one another, but can be accessed by the processor 51. The software in memory 55 can include one or more software programs, each of which includes an ordered listing of executable instructions for implementing logical functions. In the example of FIG. 6, the optional software in the memory system 55 includes a suitable operating system (O/S) 56 and program(s) 57. The operating system 56 essentially controls the execution of input/output interface 52 and other element functions, and provides scheduling, input-output control, file and data management, memory management, and communication control and related services. The operating system 56 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 57 may include various applications, add-ons, etc. configured to provide end user functionality of the device 100. In a typical example, one or more of the programs 57 may comprise instructions for controlling the functions of camera 61, accelerometer 62, microphone 63, control input 64, etc.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The device 100 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 51. In addition, the main memory may be used for storing temporary variables or other intermediate information during the execution of instructions by the processor 51. The device 100 may further include a read only memory (ROM) or other static storage device (e.g., programmable ROM (PROM), erasable PROM (EPROM), and electrically erasable PROM (EEPROM)) coupled to the bus for storing static information and instructions for the processor 51.

A camera 61 may be configured to record still image data and/or video image data of the environment around the device 100 and preferably of the environment generally located in front of the outer chin safety cover 13 that is visible to a user 200 that is wearing the inner pad member 12 on their chin 201. In preferred embodiments, a camera 61 may comprise a digital camera that encodes images and videos digitally on a charge-coupled device (CCD) image sensor or on a complementary metal-oxide-semiconductor (CMOS) image sensor and stores them for later reproduction. In other embodiments, a camera 61 may comprise any type of camera which includes an optical system, typically using a lens with a variable diaphragm to focus light or other electromagnetic radiation, such as infrared radiation for thermal imaging, onto an image pickup device or image sensor.

In preferred embodiments, a camera 61 may be seamlessly integrated into the body 11, guaranteeing a secure and ergonomic fit, such as by being coupled to the outer chin safety cover 13. Internally, the components of the camera 61 may be coated with one or more protective materials, meticulously chosen to safeguard against dust, humidity, and corrosive elements. These protective measures substantially augment the durability and reliability of the camera's 61 performance, ensuring the continued functionality and protection of electronic components during demanding gameplay and inadvertent impacts.

Generally, a camera 61 may be coupled to the body 11 and configured to capture still image data and/or video image data of the player's (user's 200) field of vision without hindering visibility. It preferably utilizes state-of-the-art high-resolution imaging technology to meticulously capture crisp and detailed video footage while executing image re-rendering processes intended to eliminate obstructions to its field of vision, including, but not limited to, face masks. To fortify the resilience of the camera 61 lens, an additional layer of impact-resistant material, such as tempered glass or polycarbonate, may be utilized in the camera window of the camera 61. This protective covering serves to shield the lens from scratches, impacts, and potential damage while preserving optimal image clarity.

Furthermore, the camera 61 preferably may comprise water-resistant or waterproof attributes, thereby affording it protection against environmental elements like rain or sweat. Stringent sealing and gasket mechanisms are effectively deployed to repel the intrusion of water or moisture into the housing, thereby preserving the camera's 61 reliability and longevity, even when subjected to adverse conditions.

The mounting mechanism within the body 11, responsible for securing the camera 61 to the body 11, undergoes reinforcement to withstand the considerable forces encountered during gameplay. Careful management of wiring and cables connecting the camera 61 to the power source 65, control input 64, and wireless communication module or radio module 53 may be achieved within the outer chin safety cover 13. An adeptly designed cable routing system for local interface 58 ensures a tidy and secure arrangement, thereby minimizing the risk of accidental disconnection or damage. Additionally, supplementary support structures and materials are judiciously implemented to guarantee the camera's 61 steadfast fixation throughout physical activities.

In preferred embodiments, the radio module 53 may be configured to transmit image data, e.g., still and/or video image data recorded by the camera 61. In further preferred embodiments, the radio module 53 may be configured to transmit image data recorded by the camera 61 in real-time (real-time meaning that an event that is recorded by the camera 61 may be transmitted by the radio module 53 almost immediately after it happens). Furthermore, the radio module 53 may enable the device 100 to communicate with a companion mobile app and/or external electronic device 400 which may provide an interface for managing camera 61 operations of the device 100 and viewing live or recorded video image footage.

In some embodiments, the device 100 may comprise an accelerometer 62 which may be coupled to the body 11. An accelerometer 62 may be configured to provide acceleration data about the device 100, such as acceleration of motion data of the body 11, to a processing unit 21. An accelerometer 62 may comprise any type of accelerometer including capacitive accelerometers, piezoelectric accelerometers, piezoresistive accelerometers, hall effect accelerometers, magnetoresistive accelerometers, heat transfer accelerometers, micro-electro mechanical system (MEMS) accelerometers, NANO technology accelerometers, or any other suitable device that is able to measure acceleration and to electrically communicate acceleration data.

In some embodiments, an accelerometer 62 may be in electronic communication with a camera 61, radio module 53, and/or a processor 51 so that acceleration of motion data of the body 11 recorded by the accelerometer 62 may activate the camera 61 to record image data that may be transmitted by a radio module 53. Optionally, an accelerometer 62 may be in electronic communication with a camera 61 and/or a processor 51 so that the accelerometer 62 may function as an automatic triggering mechanism that activates camera 61 recording based on specific events, such as impact or motion. This enables real-time streaming of the captured image data, e.g., video footage, to electronic devices 400 or platforms, providing instant access to the live video feed with programming to maintain stability and image quality during intense physical contact. In further embodiments, the accelerometer 62 may be configured to measure and record acceleration of motion data of the body 11, and the radio module 53 may be configured to transmit the acceleration of motion data of the body 11.

In some embodiments, the device 100 may comprise a microphone 63 which may be coupled to the body 11. A microphone 63 may be configured to pick up or record audio information from the environment around the device 100. In preferred embodiments, a microphone 63 may comprise any acoustic-to-electric transducer or sensor that converts sound in air into an electrical signal. In further embodiments, a microphone 63 may comprise any type of microphone such as electromagnetic induction microphones (dynamic microphones), capacitance change microphones (condenser microphones), and piezoelectricity microphones (piezoelectric microphones) to produce an electrical signal from air pressure variations.

In some embodiments, a microphone 63 may be in electronic communication with a camera 61, a radio module 53, and/or a processor 51 so that the camera 61 may be activated to record image data through voice command from a user 200. In further embodiments, the radio module 53 may be configured to transmit sound data recorded by the microphone 63 in real-time.

In some embodiments, the device 100 may comprise one or more control inputs 64 that a user 200 may interact with, such as push button or depressible button type switches, turnable control knobs, a key pad, slide type switches, rocker type switches, toggle switches, rotary switches, electromechanical relays, solid state relays, touch sensitive interfaces, and combinations thereof whether they are normally open, normally closed, momentary contact, latching contact, single pole, multi-pole, single throw, or multi-throw, touch screen graphical user interfaces (GUI), or any other suitable input that may be used to modulate electricity between components or to otherwise control functions of the device 100. In preferred embodiments, a control input 64 may comprise a camera toggle switch that is operable to activate and deactivate the camera 61. In further embodiments, Preferably, the device 100 may include control inputs 64 that may be configured as user interface buttons and indicators which allow the user 200 to control various camera 61 functions, including starting or stopping recording, adjusting settings, and initiating streaming (transmission of image data via a radio module 53).

In some embodiments, the device 100 may comprise a power source 65 which may be coupled to the body 11 and which may provide electrical power to any component that may require electrical power. A power source 65 may comprise a battery, such as a lithium-ion battery, nickel cadmium battery, alkaline battery, or any other suitable type of battery, a fuel cell, a capacitor, a super capacitor, or any other type of electricity storing and/or releasing device. In preferred embodiments, a power source 65 may comprise a rechargeable battery, such as a lithium-ion battery, nickel cadmium (NiCd) battery, nickel-metal hydride (NiMH) battery, etc. In further embodiments, a power source 65 may comprise a power cord, kinetic or piezo electric battery charging device, a solar cell or photovoltaic cell, and/or inductive charging or wireless power receiver. In further embodiments, a power source 65 may comprise a power charging and distribution module which may be configured to control the recharging of the power source 65, discharging of the power source 65, and/or distribution of power to one or more components of the device 100 that may require electrical power.

In preferred embodiments, the power source 65 may comprise a rechargeable lithium-ion battery that may be crafted from plastic or polymer materials specially engineered to insulate and shield the battery cells, and may be seamlessly integrated into the outer chin safety cover 13 to provide power to the camera 61. The power source 65 is thoughtfully designed with a capacity intended to deliver ample power for extended periods of gameplay. Furthermore, the power source 65 is meticulously engineered to exhibit water-resistant or waterproof attributes, thereby affording them protection against environmental elements like rain or sweat.

In some embodiments, the device 100 may comprise a charging port 66 that may be in electronic communication with the power source 65 and which may be configured to mate with a complementary external plug member which may be configured to supply electrical power to the power source 65. Once the charging port 66 is mated with a complementary external plug member, electrical power may be communicated from the external plug member, through the charging port 66, and to the power source 65 thereby allowing the power source 65 to be charged or recharged by the external plug member. In preferred embodiments, a charging port 66 may comprise a USB connector such as a female micro-USB or female mini-USB. In other embodiments, a charging port 66 may comprise a male or female Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a Lightning plug, a 30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of enabling electrical communication.

Figure 3:
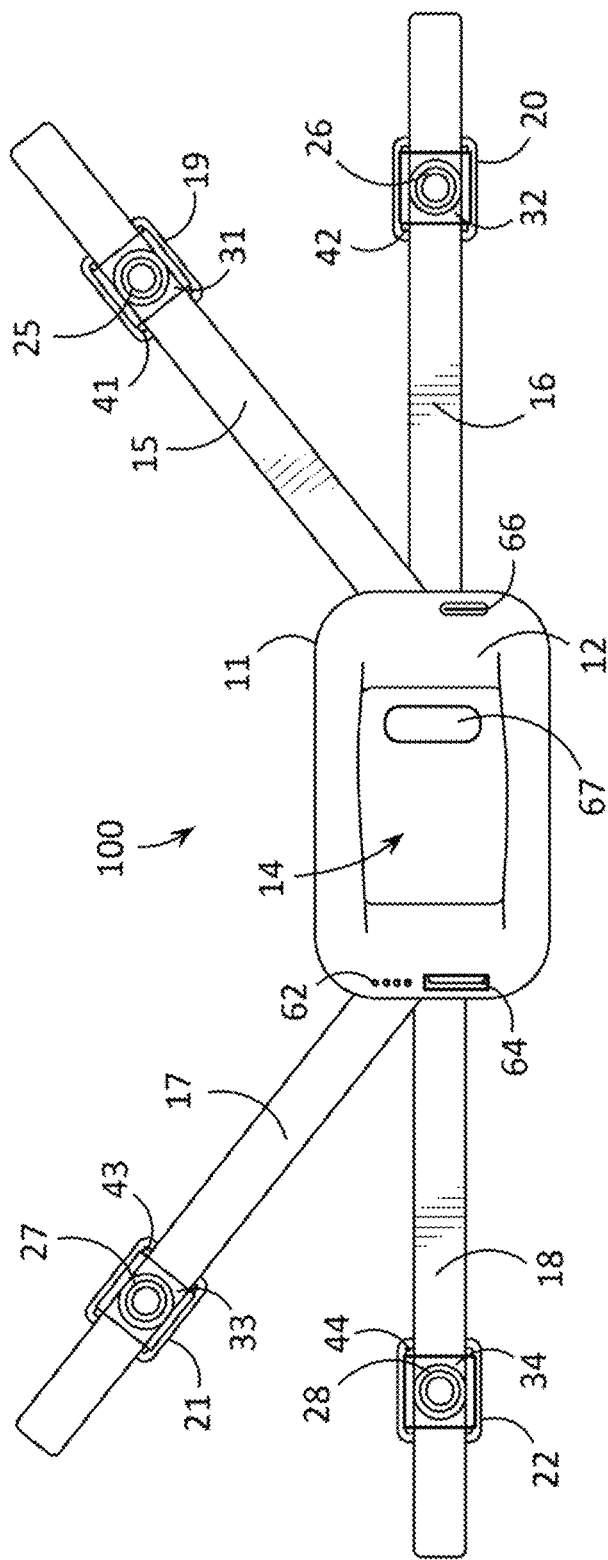
FIG. 3 shows a rear elevation view of an example of a chinstrap camera device according to various embodiments described herein.
Figure 4:
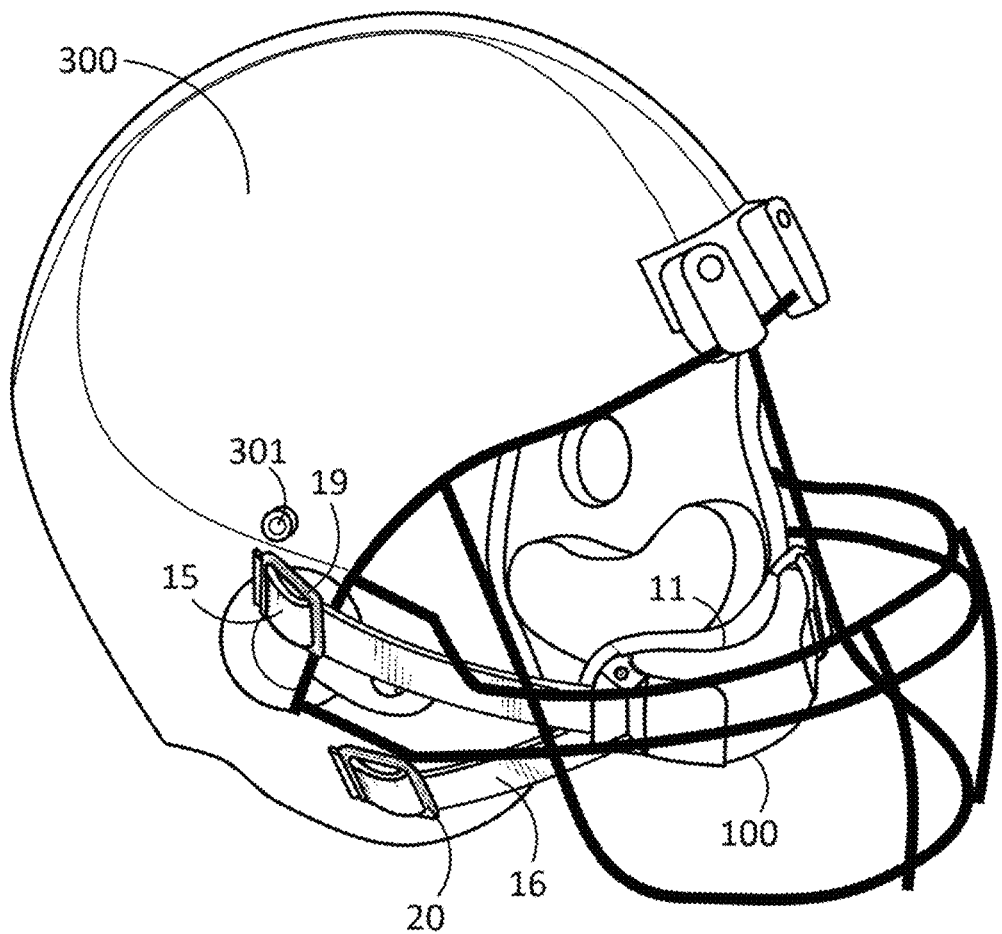
FIG. 4 depicts a perspective view of an example of a chinstrap camera device having its body coupled to a helmet according to various embodiments described herein.
Figure 5:
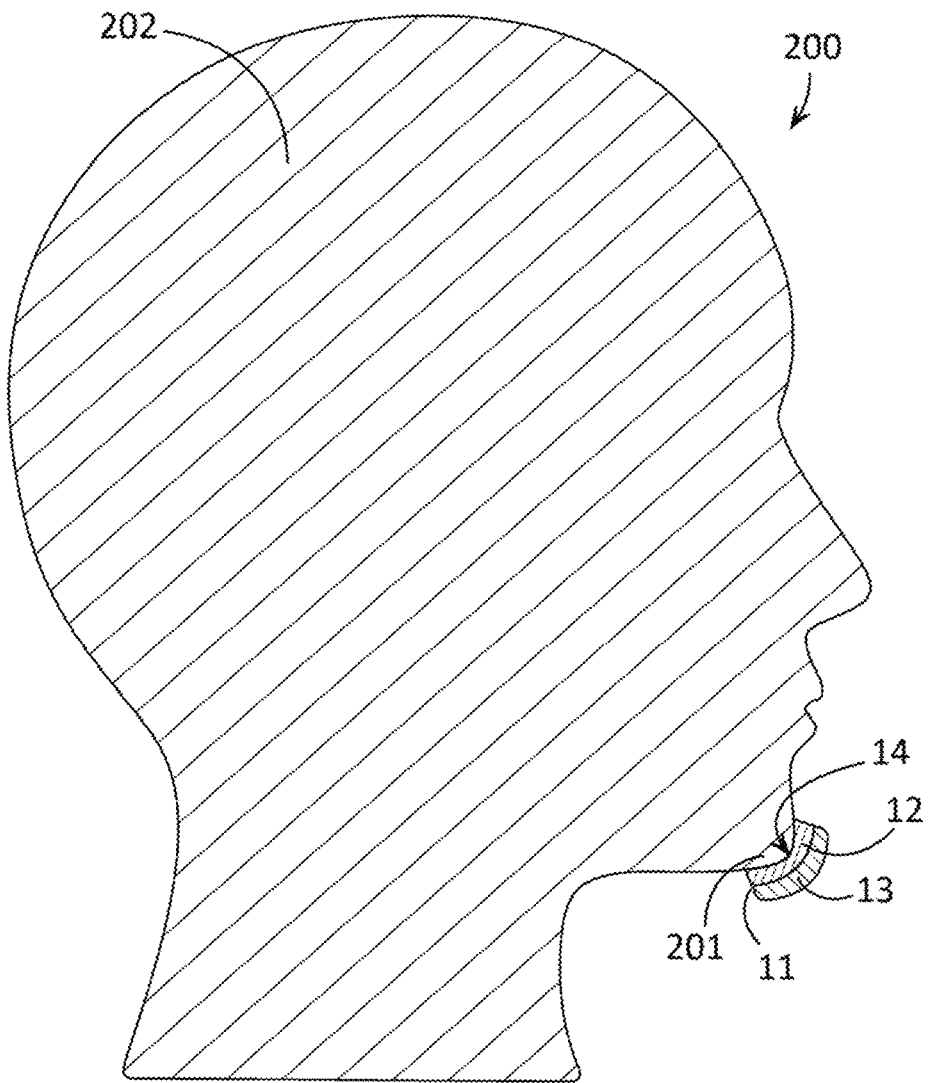
FIG. 5 illustrates a sectional elevation view of an example of a chinstrap camera device positioned on the chin of a user according to various embodiments described herein.

In some embodiments, the device 100 may comprise a physiological sensor 67 which may be coupled to the body 11. In preferred embodiments, and as shown in FIG. 3, a physiological sensor 67 may be coupled to the inner pad member 12 within the body cavity 14 so that the physiological sensor 67 may contact or be positioned proximate to the chin 201 of the user 200 when the chin 201 is positioned in the body cavity 14. A physiological sensor 67 may be configured to record physiological parameters, such as heart rate, blood pressure, body temperature, etc., of a user 200. In preferred embodiments, a physiological sensor 67 may comprise a pulse oximeter, or Pulse Ox, which is an electronic device that measures the saturation of oxygen carried in a user's 200 red blood cells, and the physiological sensor 67 may be configured to provide pulse oximetry data (data describing oxygen saturation of a user's 200 blood and optionally pulse data) to a processing unit 21. A pulse oximeter physiological sensor 67 may comprise any type of device or sensor that is configured to provide pulse oximetry data including an optical pulse oximetry sensor (standard pulse oximeter passes two wavelengths of light through tissue to a photodetector), a reflectance pulse oximetry sensor (places the photodetector on the same surface as the illumination and does not require a thin section of the person's body and therefore may be used almost anywhere on the body, such as the forehead, chin, chest, or feet), etc.

In some embodiments, a physiological sensor 67 may be in electronic communication with a camera 61, radio module 53, and/or a processor 51 so that pulse oximetry data recorded by the physiological sensor 67 may be transmitted by a radio module 53. This enables real-time streaming of the pulse oximetry data to electronic devices 400 or platforms, providing instant access to physiological data of a user 200 that is wearing the device 100.

In some embodiments, the device 100 may comprise one or more removable covers, such as a first removable cover 37 and a second removable cover 38, that may be removably coupled to the body 11 and which may be configured to govern access to one or more electrical components that are coupled to the body 11. In some embodiments, one or more removable covers, such as a first removable cover 37 and a second removable cover 38, may be coupled to the outer chin safety cover 13. In further embodiments, one or more removable covers, such as a first removable cover 37 and a second removable cover 38, may be coupled to the outer chin safety cover 13 and/or to the inner pad member 12. Any suitable removable coupling method may be used to couple a removable cover 37, 38, to the body 11. For example, a removable cover 37, 38, may be removably coupled to the body 11 by being press fit or snap fit together, via snap fasteners, via threaded fasteners, via a slide to lock connection method, etc.

Removable covers 37, 38, may be configured in any size and shape. In preferred embodiments, removable covers 37, 38, may comprise substantially rigid materials, such as which may be used to form outer chin safety cover 13, that may include impact-resistant materials, including but not limited to Thermoplastic Polyurethane (TPU), Polycarbonate (PC), and rubberized coatings. Optionally, removable covers 37, 38, may comprise cushioning materials, such as which may be used to form inner pad member 12. Substantially rigid materials and/or cushioning materials of removable covers 37, 38, may effectively shield one or more electronic components (51, 52, 53, 54, 55, 61, 62, 63, 64, 65, 66, 67) from impact forces and the rigors of gameplay, thereby preserving its integrity and functionality.

In some embodiments, one or more electronic components (51, 52, 53, 54, 55, 61, 62, 63, 64, 65, 66, 67) of the device 100 may be integrated into the left and right sides of the outer chin safety cover 13 so that the one or more electronic components (51, 52, 53, 54, 55, 61, 62, 63, 64, 65, 66, 67) may be separated by the central region 13A and body cavity 14 of the body 11. These electronic components (51, 52, 53, 54, 55, 61, 62, 63, 64, 65, 66, 67) may be safeguarded by a first removable cover 37 and/or a second removable cover 38, and once removable cover(s) 37, 38, are removed or opened from the body 11, one or more of the electronic components (51, 52, 53, 54, 55, 61, 62, 63, 64, 65, 66, 67) may be accessed.

It should be understood that electronic components (51, 52, 53, 54, 55, 61, 62, 63, 64, 65, 66, 67) may be coupled to any element of the device 100 and more preferably coupled to an outer chin safety cover 13 and/or an inner pad member 12. In preferred embodiments, the device 100 may comprise a first removable cover 37, optionally coupled to the body 11 by being coupled to the left side of the outer chin safety cover 13 (e.g., coupled to the outer chin safety cover 13 left of the central region 13A), and the power source 65 may be positioned between the body 11 and the first removable cover 37. In further embodiments, a radio module 53 may be positioned between the body 11 and the first removable cover 37. In some embodiments, a first removable cover 37 may be dedicated to safeguarding a power source 65, such as a lithium-ion battery unit, and the radio module 53. Optionally, a power source 65 and a radio module 53 may be integrated together and may be collectively referred to as "a power module."

In preferred embodiments, the device 100 may comprise a second removable cover 38, optionally coupled to the body 11 by being coupled to the right side of the outer chin safety cover 13 (e.g., coupled to the outer chin safety cover 13 right of the central region 13A), and all or portions of the camera 61 may be positioned between the body 11 and the second removable cover 38 so that the second removable cover 38 covers at least a portion of the camera 61. In some embodiments, a second removable cover 38 may comprise a camera window 39 which may comprise an opening or aperture which may be positioned over the lens of the camera 61. In further embodiments, a second removable cover 38 may comprise a camera window 39 which may comprise a clear or transparent material, such as clear plastic, which may be positioned over the lens of the camera 61.

In further embodiments, a microphone 63 may be positioned between the body 11 and the second removable cover 38. In some embodiments, a second removable cover 38 may comprise a microphone window 40 which may comprise an opening or aperture which may be positioned over the microphone 63 to aid in the ability of the microphone 63 to pick up sound. In some embodiments, a second removable cover 38 may be dedicated to safeguarding a power source 65, such as a lithium-ion battery unit, and the radio module 53. Optionally, processor 51, I/O interfaces 52, radio module 53, data store 54, memory 55, camera 61, and microphone 63 may be integrated together and may be collectively referred to as "a camera module."

In preferred embodiments, ideally situated at the uppermost section of the inner pad member 12 may be a control input 64 that may function as a camera toggle switch, as shown in FIG. 3, that may be configured for enabling the user 200 or wearer to manually initiate and terminate recording and streaming functions of the camera 61.

In some embodiments, preferably positioned directly within the inner pad member 12, an accelerometer 62 may be positioned, that is designed to measure rapid forces on the device 100. In some embodiments, a charging port 66, such as a USB-C charging port 66, may be coupled to inner pad member 12, as shown in FIG. 3.

In preferred embodiments, stringent sealing and gasket mechanisms are effectively utilized on the interface between removable covers 37, 38, and the interface of inner pad member 12 and outer chin safety cover 13 to prevent the intrusion of water or moisture into the body 11, thereby preserving the camera 61 and power source 65 reliability and longevity, even when subjected to adverse conditions. In preferred embodiments, the device 100 may comprise a power module that is meticulously constructed to securely anchor the power source 65 in place, effectively averting any inadvertent disconnection, movement, or displacement during gameplay. Within the body 11, materials characterized by their heat-resistant attributes, such as fire-retardant plastics or insulating materials, are judiciously employed. These materials, in combination with well-conceived ventilation and cooling features integrated into the removable covers 37, 38, serve the dual purpose of dissipating heat generated during power source 65 operation and maintaining safe operating temperatures, thereby ensuring the device's 100 reliable and secure performance.

While some exemplary shapes and sizes have been provided for elements of the device 100, it should be understood to one of ordinary skill in the art that the body 11, inner pad member 12, outer chin safety cover 13, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A chinstrap camera device, the device comprising:
   a body comprising an inner pad member and an outer chin safety cover, wherein the inner pad member is coupled to the outer chin safety cover, and wherein the inner pad member comprises a body cavity that is configured to receive a portion of a chin of a user;
   one or more flexible straps coupled to the body;
   a helmet fastener that is coupled to the one or more flexible straps, wherein the helmet fastener is configured to be coupled to a helmet;
   a camera coupled to the body; and
   a radio module coupled to the body, the radio module in electronic communication with the camera, wherein the radio module is configured to transmit image data recorded by the camera.

2. The device of claim 1, wherein the radio module is configured to transmit image data recorded by the camera in real-time.

3. The device of claim 1, wherein the one or more straps are removably coupled to the body.

4. The device of claim 1, wherein the helmet fastener comprises a snap fastener.

5. The device of claim 1, wherein the helmet fastener comprises a helmet buckle.

6. The device of claim 1, wherein the inner pad member comprises a cushioning material.

7. The device of claim 1, wherein the outer chin safety cover comprises a substantially rigid material.

8. The device of claim 1, wherein the image data recorded by the camera comprises video image data.

9. The device of claim 1, further comprising a power source that is coupled to the body.

10. The device of claim 9, wherein power source is a rechargeable battery.

11. The device of claim 10, further comprising a charging port that is in electronic communication with the power source.

12. The device of claim 1, further comprising an accelerometer that is in electronic communication with the radio module.

13. The device of claim 1, wherein the accelerometer is configured to measure acceleration of motion data of the body, and wherein the radio module is configured to transmit the acceleration of motion data of the body.

14. The device of claim 1, further comprising a microphone that is in electronic communication with the radio module.

15. The device of claim 14, wherein the radio module is configured to transmit sound data recorded by the microphone in real-time.

16. The device of claim 1, further comprising a control input that is operable to activate and deactivate the camera.

17. The device of claim 1, further comprising a first removable cover that is removably coupled to the body.

18. The device of claim 17, further comprising a power source that is coupled to the body, wherein the power source is positioned between the body and the first removable cover.

19. The device of claim 17, further comprising a second removable cover that is removably coupled to the body, wherein the second removable cover covers a portion of the camera.

20. The device of claim 1, further comprising a physiological sensor that is coupled to the inner pad member, wherein the physiological sensor comprises a pulse oximeter, and wherein the physiological sensor is in electronic communication with the radio module.

* * * * *